No. 652,799. Patented July 3, 1900.
F. A. MILLER.
BACK PEDALING BRAKE.
(Application filed Mar. 6, 1899.)
(No Model.)
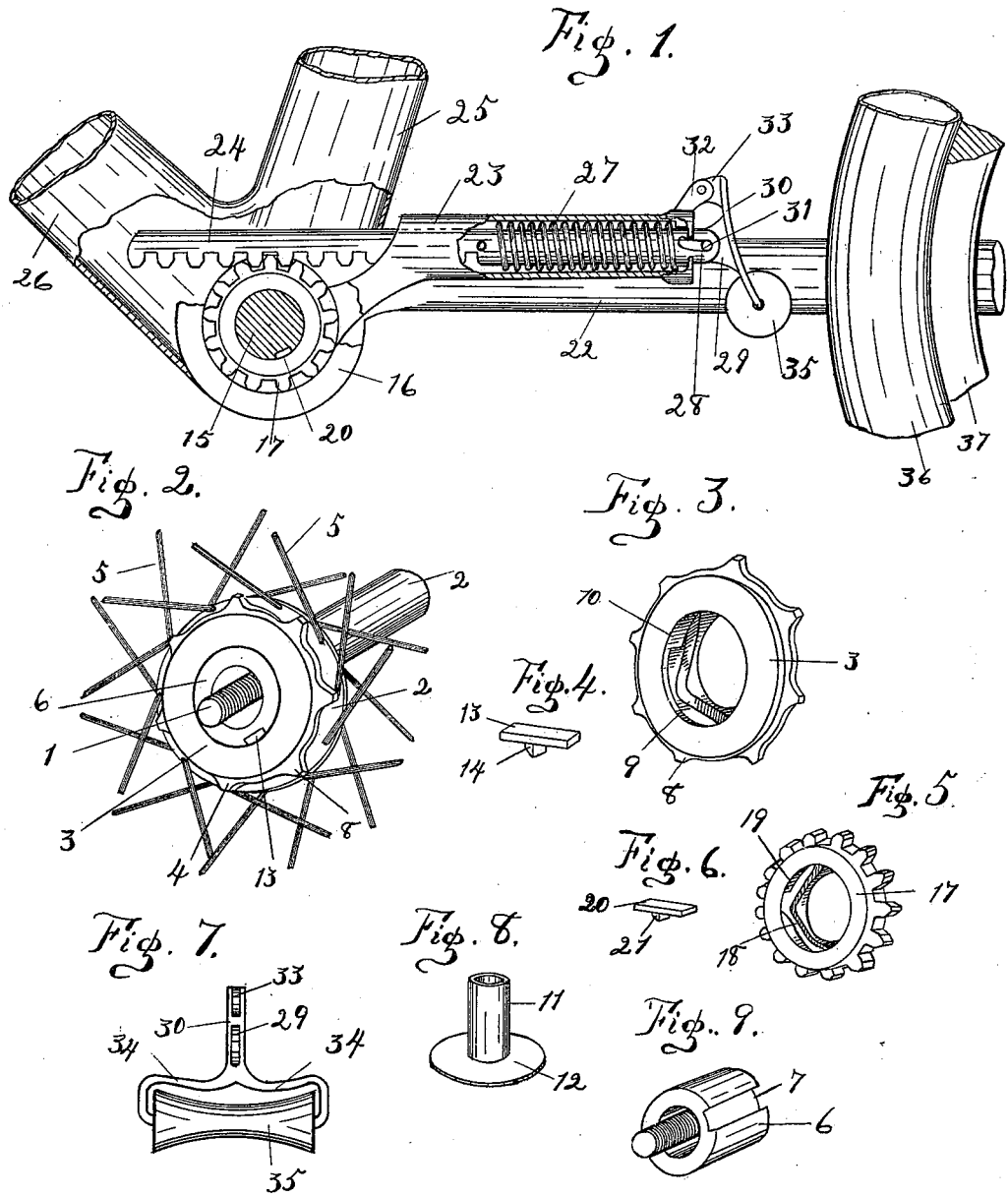
WITNESSES:
Adelaide Kearns.
Ada Crawford.
Frederick A. Miller. INVENTOR
BY Chapin & Denny
His ATTORNEYS

United States Patent Office.

FREDERICK A. MILLER, OF FORT WAYNE, INDIANA.

BACK-PEDALING BRAKE.

SPECIFICATION forming part of Letters Patent No. 652,799, dated July 3, 1900.

Application filed March 6, 1899. Serial No. 707,831. (No model.)

*To all whom it may concern:*

Be it known that I, FREDERICK A. MILLER, a citizen of the United States, residing at Fort Wayne, in the county of Allen, in the State of Indiana, have invented certain new and useful Improvements in Automatic Coasters and Brakes for Bicycles; and I do hereby declare that the following is a full, clear, and exact description of the invention, which will enable others skilled in the art to which it appertains to make and use the same, reference being had to the accompanying drawings, which form a part of this specification.

My invention relates to improvements in automatic coasters and brake mechanism for bicycles and like vehicles.

The object of my invention is to provide an improved automatic coaster and back-pedaling brake for bicycles of simple and economical construction by the use of which in coasting the driving sprocket and chain will remain at rest and in which the spring-pressed brake will automatically resume its normal position when released.

My present invention consists of a clutch comprising an internally-grooved driving-gear adapted for a holding engagement with a relatively-fixed key, but which key is laterally adjustable in its seat and permits a free rotation of said gear when rotated in a reverse direction, and a brake mechanism for the driving-wheel consisting of a clutch mechanism, a rack-bar in a meshing engagement with said clutch-gear, and a spring-pressed brake in coöperative relation with the tire of the driving-wheel.

The novel features of my invention are, first, the driving-sprocket, adapted for a free rotary movement on the rear-wheel axle by a reverse movement of the driving-gear, and, second, the spring-actuated brake and the means for actuating the said brake.

In the accompanying drawings, in which similar reference-numerals indicate like parts, Figure 1 is a side view of my improved back-pedaling brake in position on the bicycle-frame, which is broken away in part to show the relative arrangement of the operating mechanism. Fig. 2 is a view of the driving-sprocket in position on the rear-wheel shaft, showing the arrangement of the locking-key therefor. Fig. 3 is a perspective detail of the driving-disk, showing the internal peripheral groove and the locking-lugs therein. Fig. 4 is a detail of the key for said driving-sprocket, showing the lateral lug which engages the said locking-lugs. Fig. 5 is a perspective detail of the gear which actuates the brake, and Fig. 6 is the locking-key therefor. Fig. 7 is a detail rear view of the brake-shoe. Fig. 8 is a detail of the dust-excluding sleeve for the outer end of the driving-wheel shaft. Fig. 9 is a detail of the slotted sleeve fixed on the hub in which the key is slidably mounted.

Upon the shaft 1 is placed the hub 2, and to this hub spokes 5 are secured in the usual manner. Placed inside of the hub and secured thereto is the sleeve 6, which is provided with a longitudinal slot 7 to receive the key hereinafter described. Adjacent to the outer face of one of said hubs 2 is arranged the driving-sprocket 3, revolubly mounted on the said fixed sleeve 6 and provided upon its outer perimeter with the sprockets 8 for the driving-chain. This driving-sprocket 3 is provided upon its inner perimeter with an annular groove 9, having a series of locking-lugs 10 upon one side thereof, preferably four in number, adapted to form a holding engagement with the said key when the driving-wheel is rotated or driven in a forward direction, but which permits a free rotation of said sprocket in a reverse direction. The annular space between the said sleeve 6 and the shaft 1 is closed by the sleeve 11, having upon its outer end a dust-excluding annular flange 12, Fig. 8, which is then secured in position by a proper nut upon the screw-threaded end of said shaft 1. The said driving-sprocket can of course be provided with proper ball-bearings, if desired, in a well-understood manner. In the said slot 7 of the fixed sleeve 6 is slidably mounted the key 13, Figs. 2 and 4, provided upon its outer face with a triangular lug 14, which projects into the said peripheral groove 9 of said disk and forms a holding engagement with the said locking-lugs 10, as described.

On the crank-shaft 15 and in the crank-hanger 16 is rotatably mounted the toothed gear-wheel 17, provided upon its inner perimeter with an annular groove 18, having upon one side thereof a series of lugs 19, adapted to holdingly engage the key 20, Fig. 8, having a lug 21, adapted to project into the said groove 18 and holdingly engage the said lugs 19 when the crank-shaft is rotated in a reverse direction, but which passes said lugs when the said crank-shaft is rotated in a forward direction, thereby leaving the said wheel normally an idler. Between the backstays 22 and at the forward end thereof is arranged a horizontal sleeve or cylinder 23. This sleeve is rigidly secured in position in any proper manner, preferably by fixing its forward end to the said crank-hanger and then securing its free or rear end by proper lateral stays. (Not shown.) In this sleeve, which is open at both ends, is loosely mounted a proper horizontal rack-bar 24, adapted for a meshing engagement with the said gear 17 and whose forward end extends into the lower portion of the bottom tube 25 and the diagonal tube 26 of the frame, as seen in Fig. 1. Upon the rear end of said rack-bar 24 is fixed a coil-spring 27, the rear end of said rack-bar forming the brake-plunger 28, loosely arranged in the rear end of the said sleeve 23. This plunger end of the said rack-bar is vertically slotted to loosely contain the ear 29 on the rear face of the brake-hanger arm 30, which is secured therein by a proper pivot 31. The rear end of the said sleeve 23 has an upright lug 32, which is pivotally connected to an ear 33 on the upper extremity of said arm, Fig. 1. This arm 30 has upon its lower end a bifurcation 34, in which is revolubly mounted a brake-shoe 35, adapted for a frictional contact with the tire 36 of the adjacent rear wheel 37.

The operation of my improvement thus described is obvious and, briefly stated, is as follows: When the operator is rotating the pedals in the usual manner or forwardly, the key 13 will be in a locked engagement with the said sprocket 3, as described; but when the operator desires to coast he holds the pedals in a stationary position, whereupon the key 13 will freely slide back and forth in the said slot 7 of the fixed sleeve 6, as the said lug 14 on the key follows the windings of the said groove as it freely passes the said lugs 10, thereby permitting the said driving-gear 3 to remain at rest while the driving-wheel on which it is mounted is rotated at any desired speed. In the forward portion of the brake mechanism the above-described operation is reversed, the said gear 17 being normally an idler when the vehicle is in use, the key 20 being so arranged relative to the said locking-lugs 19 as to permit the key-lug 21 to freely follow the irregularities of the said groove 18, but adapted to form a holding engagement with said lugs 19 when the action of the pedals is reversed, and thereby form an actuating engagement with the said rack-bar 24, whereby the said brake-plunger end is operated to force said brake-shoe into a frictional engagement with the said driving-wheel tire. When the back-pedaling action ceases, the said gear 17 will be released from its engagement with said key 20, and the rack-bar 24 will be forced forward to its normal position by the tension of the said coil-spring 27, withdrawing with it the brake-shoe 35 from its contact with said tire.

What I desire to secure by Letters Patent is—

1. In a bicycle, or other vehicle, the driving sprocket or gear loosely mounted upon the driving-wheel, and having formed in its inner surface a groove that is formed into a series of continuous cams with shoulders or locking-lugs on one side of the groove, a slidably-mounted key which is adapted to be moved back and forth in said groove, and a keyway in which said key is loosely placed combined with a driving-wheel, and means for causing it to revolve, whereby the said sprocket is made to revolve the wheel when turning in a forward direction, and to remain an idler when turning backward, substantially as shown.

2. In a bicycle, or other vehicle, the driven wheel, the fixed sleeve fast to the hub of the driven wheel and provided with a longitudinal groove in its surface, and the sprocket-gear loosely mounted on said sleeve, and having formed in its inner surface, a groove that is formed into a series of continuous cams with shoulders or locking-lugs on one side of the groove, combined with a key slidably mounted in the groove in the fixed sleeve, and adapted to hold the said gear and cause it to revolve with the driven wheel when turning in a forward direction, and to release the gear when turning in an opposite one, substantially as described.

Signed by me at Fort Wayne, county of Allen, State of Indiana, this 27th day of February, A. D. 1899.

FREDERICK A. MILLER.

Witnesses:
ADELAIDE KEARNS,
FRANK C. KEARNS.